(12) United States Patent
Omiya et al.

(10) Patent No.: US 6,837,784 B2
(45) Date of Patent: Jan. 4, 2005

(54) VENTILATION DEVICE

(75) Inventors: Yoshimasa Omiya, Aichi-ken (JP); Yasunobu Teramoto, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/737,753

(22) Filed: Dec. 18, 2003

(65) Prior Publication Data

US 2004/0127154 A1 Jul. 1, 2004

(30) Foreign Application Priority Data

Dec. 26, 2002 (JP) ........................................ 2002-378633

(51) Int. Cl.⁷ .................................................. B60H 1/26
(52) U.S. Cl. ...................... 454/162; 137/512.1; 137/855
(58) Field of Search .................. 454/162, 164, 454/165; 137/512.15, 512.5, 857, 512.1, 855

(56) References Cited

U.S. PATENT DOCUMENTS 5,823,870 A * 10/1998 Emerling et al. ........... 454/162

FOREIGN PATENT DOCUMENTS

JP   A-H07-179118   7/1995

* cited by examiner

Primary Examiner—Harold Joyce
(74) Attorney, Agent, or Firm—Posz & Bethards, PLC

(57) ABSTRACT

A ventilation device has a duct main body, a valve body, and pairs of widened portions. The duct main body has an opening. The duct main body has an upper edge defining a part of the opening. A plurality of insertion slots are formed in and along the upper edge. The valve body has a plurality of substantially triangular engaging pieces provided at an upper end of the valve body. Each engaging piece is inserted in one of the insertion slots, such that the valve body is hung by the duct body to be capable of opening and closing the opening. Each pair of the widened portions is provided at side sections of one of the insertion slots. When the engaging pieces are being inserted in the insertion slots, each pair of the widened portions permit the corresponding engaging piece to be deformed.

10 Claims, 6 Drawing Sheets

Fig.3
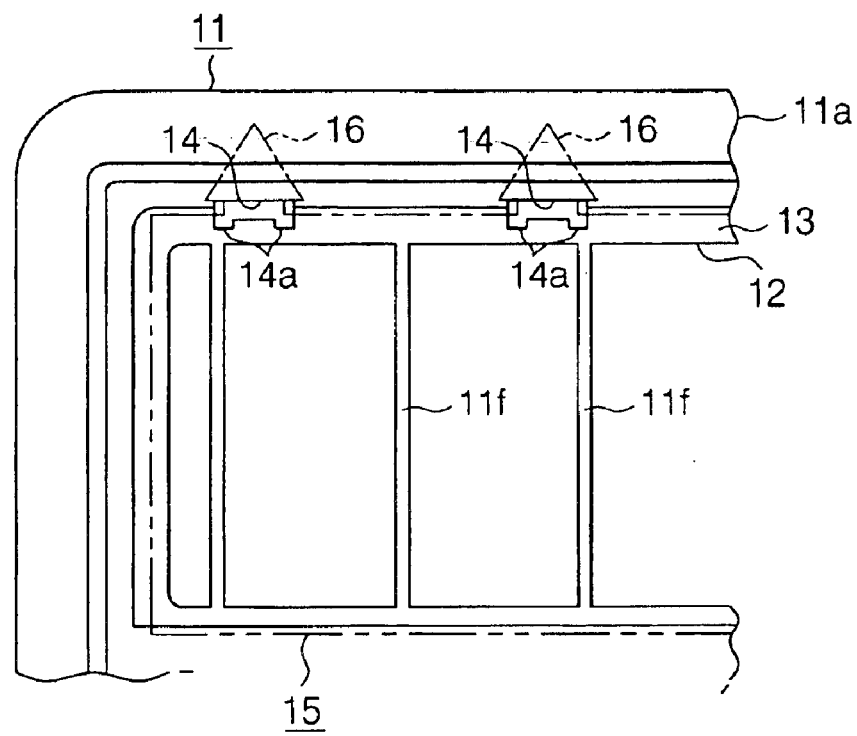
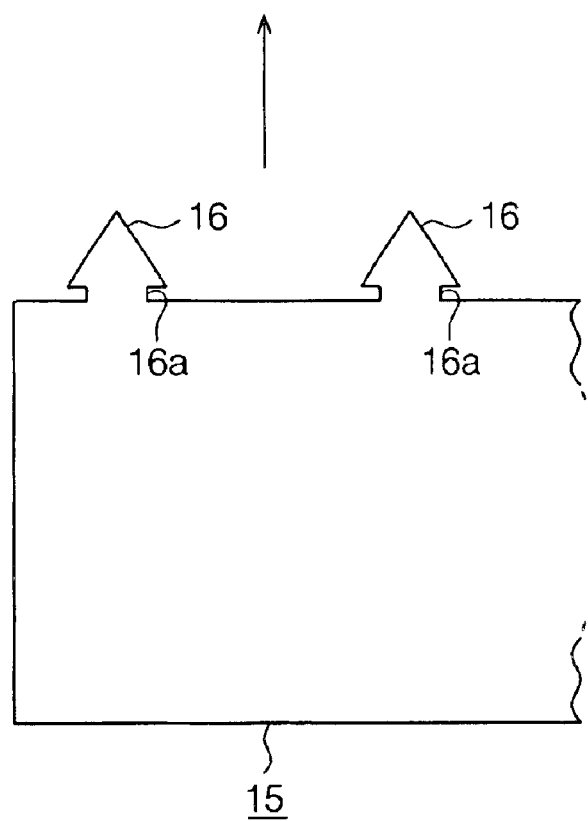

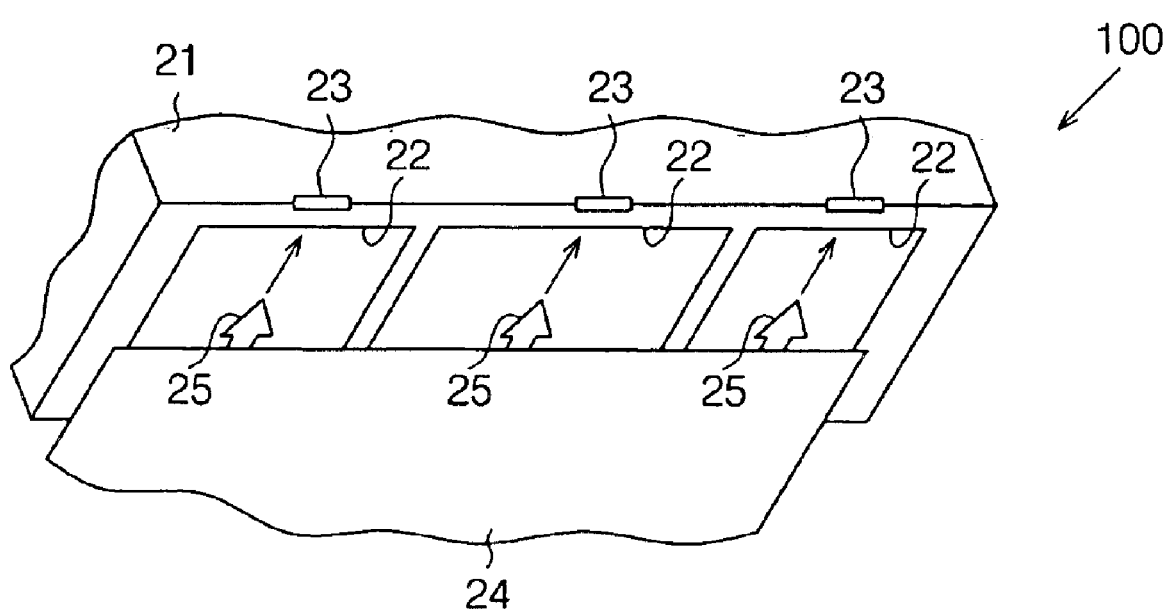

VENTILATION DEVICE

BACKGROUND OF THE INVENTION

The present invention relates to a ventilation device such as a duct quarter vent for preventing the pressure in a vehicle passenger compartment from increasing when the doors are shut.

A prior art ventilation device 100 shown in FIGS. 8 to 10(*b*) is attached to an opening formed in an inconspicuous part of a rear section of a vehicle. The ventilation device 100 has a duct main body 21 attached to the opening of the vehicle. The duct main body 21 has openings 22. Insertion slots 23 are formed in an upper edge of the duct main body 21. The insertion slots 23 are spaced at a predetermined interval. A valve body 24 is formed of an elastic material such as a rubber sheet. Substantially triangular engaging pieces 25 are provided at an end of the valve body 24. The engaging pieces 25 are spaced at a predetermined interval. When each engaging piece 25 is inserted in the corresponding insertion slot 23, side sections of the engaging piece 25 project by a great amount from the sides of the insertion slot 23. As a result, the valve body 24 is hung from the duct main body 21 such that the valve body 24 selectively opens and closes the openings 22.

When the valve body 24 is attached to the duct main body 21, each engaging piece 25 is entirely flexed as shown in FIG. 10(*a*). Particularly, the side sections of each engaging piece 25 are flexed at a relatively small curvature. The insertion causes the engaging pieces 25 to receive a great resistance, which makes the attaching of the valve body 24 burdensome.

To eliminate such a drawback, the width W of each insertion slot 23 shown in FIG. 10(*a*) may be increased to reduce the resistance. However, the widened width W cause the engaging piece 25 to easily come off the slot 23.

To reduce the resistance applied to each engaging piece 25 by the corresponding insertion slot 23, Japanese Laid-Open Patent Publication No. 7-179118 discloses a ventilation device 101 shown in FIG. 11. In this configuration, the upper end 23*a* of each insertion slot 23 is chamfered. Each engaging piece 25 of the valve body 24 is easily engaged with the corresponding insertion slot 23 through the upper end 23*a*. In accordance with the difference between the pressure in the passenger compartment and the outside pressure, each valve body 24 is moved in a range of opening width X of the corresponding insertion slots 23.

However, the engaging force of the engaging pieces 25 and the insertion slots 23 is weak in the ventilation device 101 shown in FIG. 11, and the engaging pieces 25 easily come off the slots 23 as in the case where the width W of the slots 23 is increased. Particularly, when the valve body 24 is moved away from the openings 22, the valve body 24 lies along the plane containing the upper ends 23*a*. Since the thickness t of the valve body 24 is less than the opening width X of the insertion slots 23, the engaging pieces 25 are likely to come off the insertion slots 23.

SUMMARY OF THE INVENTION

Accordingly, it is an objective of the present invention to provide a ventilation device that permits engaging pieces of a valve body to be easily engaged with insertion slots and reliably maintains the engagement.

To achieve the foregoing and other objectives and in accordance with the purpose of the present invention, a ventilation device having a duct main body, a valve body, and pairs of widened portions is provided. The duct main body has an opening. The duct main body has an upper edge defining a part of the opening. A plurality of insertion slots are formed in and along the upper edge. The valve body is formed as a sheet. The valve body has a plurality of substantially triangular engaging pieces provided at an upper end of the valve body. Each engaging piece is inserted in one of the insertion slots, such that the valve body is hung by the duct body to be capable of opening and closing the opening. Each pair of the widened portions is provided at side sections of one of the insertion slots. When the engaging pieces are being inserted in the insertion slots, each pair of the widened portions permit the corresponding engaging piece to be deformed.

The present invention also provides another ventilation device, which has a duct main body and a valve body. The duct main body has an opening. The duct main body has an upper edge defining a part of the opening. A plurality of insertion slots are formed in and along the upper edge. The valve body has a plurality of substantially triangular engaging pieces provided at an upper end of the valve body. Each engaging piece is inserted in one of the insertion slots, such that the valve body is hung by the duct body to be capable of opening and closing the opening. The distance between the side edges of each insertion slots is gradually decreased in a direction along which the corresponding engaging piece is inserted in the insertion slot.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is an exploded front view illustrating part of the ventilation device shown in FIG. 2;

FIG. 4(*b*) is partial cross-sectional view for showing insertion of an engaging piece in an insertion slot;

FIG. 7(*b*) is a partial cross-sectional view illustrating a modification;

FIG. 7(*c*) is a partial cross-sectional view illustrating a modification;

FIG. 7(*d*) is a partial cross-sectional view illustrating a modification;

FIG. 8 is an exploded perspective view illustrating a prior art ventilation device;

DETAILED DESCRIPTION OF THE PREFERRED EMBODIMENTS

A first embodiment of the present invention will now be described with reference to FIGS. 1 to 4(b).

Figure 1:
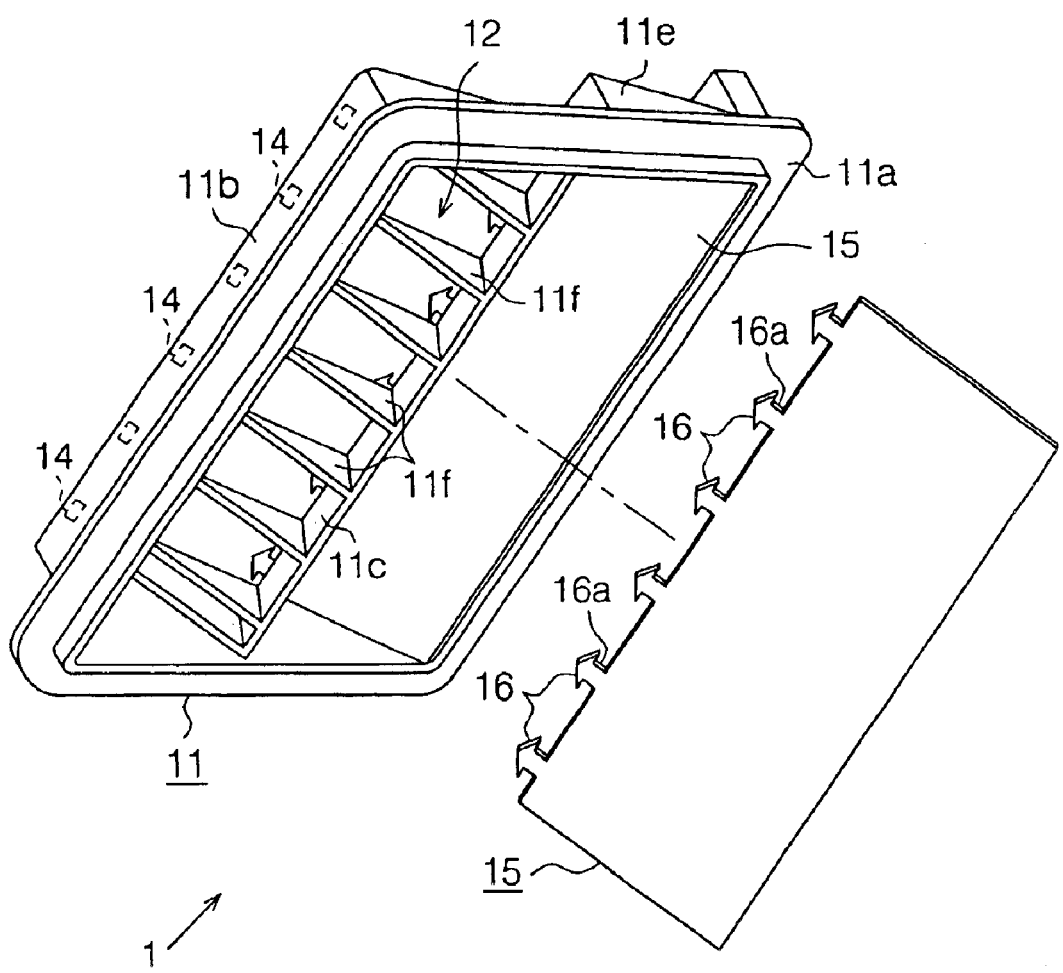
FIG. 1 is a perspective view illustrating a ventilation device according to a first embodiment of the present invention.
Figure 2:
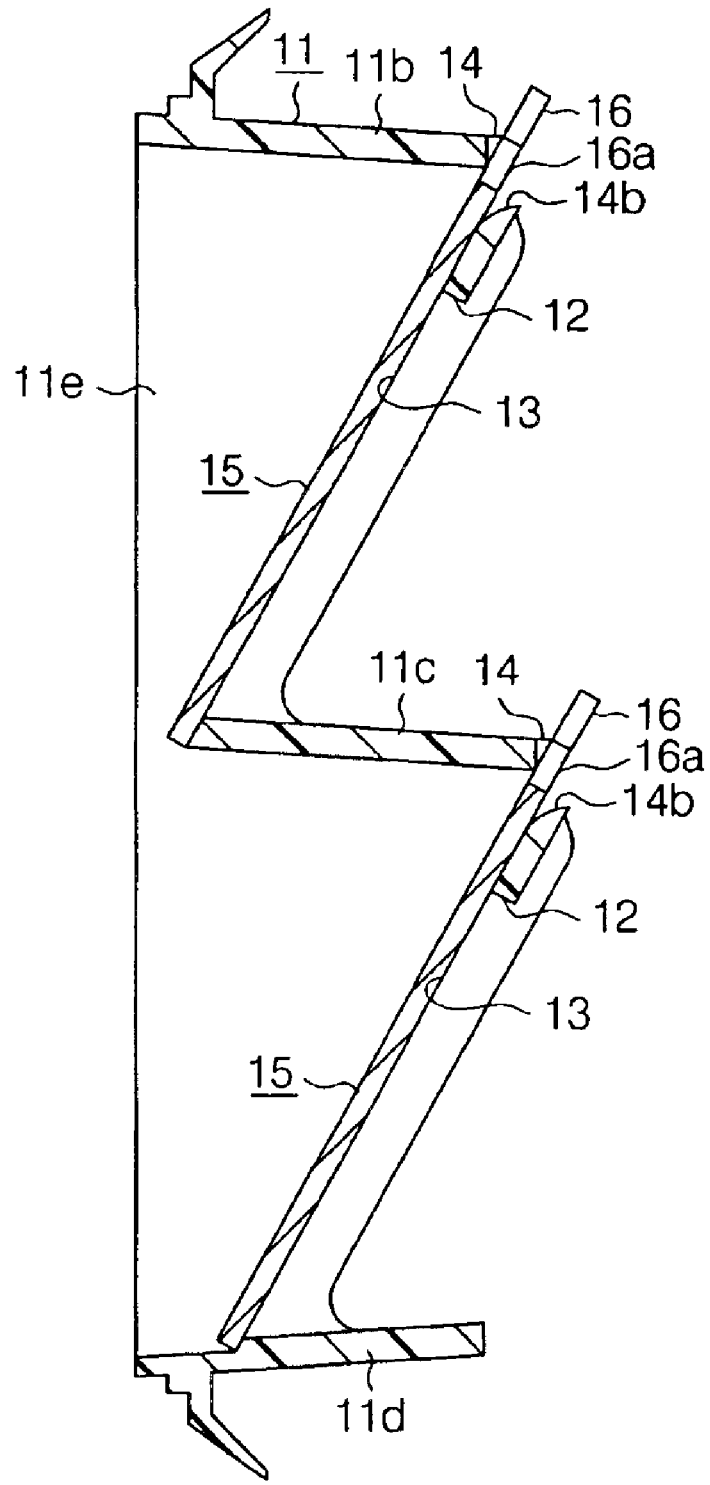
FIG. 2 is a cross-sectional view illustrating the ventilation device of FIG. 1.

As shown in FIGS. 1 to 3, a ventilation device 1 includes a duct main body 11 and a pair of valve bodies 15. The duct main body 11 is a substantially rectangular frame made of resin. Each valve body 15 is also substantially rectangular. The duct main body 11 includes a frame portion 11a forming a peripheral portion, an upper plate portion 11b, a middle plate portion 11c, a lower plate portion 11d, and a pair of sidewalls 11e. The sidewalls 11e are formed integrally with the plate portions 11b, 11c, and 11d. The frame portion 11a is attached to an opening (not shown) formed in a rear section of a vehicle. The plate portions 11b, 11c, and 11d are arranged parallel to each other. The duct main body 11 has ventilation openings 12. The openings 12 are defined by ribs 11f that are formed integrally with the plate portions 11b, 11c, 11d. Each rib 11f has a valve seat surface 13 that is inclined relative to the longitudinal direction of the frame 11a by a predetermined angle. The rightward direction as viewed in FIG. 2 is defined as the frontward direction of the vehicle, and the leftward direction is defined as the rearward direction. The upper portion of each valve seat surface 13 faces frontward direction of the vehicle. The position of each valve seat surface 13 is not limited to that shown in FIG. 2. However, an upper portion of each valve seat surface 13 may be located at a side section of the vehicle.

As shown in FIG. 2, insertion slots 14 are formed at a part where an edge of the upper plate portion 11b and the ribs 11f extending from the middle plate portion 11c intersect. Also, insertion slots 14 are formed at a part where an edge of the middle plate portion 11c and the ribs 11f extending from the lower plate portion 11d intersect. Each insertion slot 14 extends along the longitudinal direction of the frame portion 11a.

The valve bodies 15 are formed of rubber sheets. Substantially triangular engaging pieces 16 are formed on the upper end of each valve body 15. The engaging pieces 16 are spaced at a predetermined interval. Each engaging piece 16 has a coupling portion 16a the width of which is shorter than the base of the triangular portion. Each engaging piece 16 is coupled to the corresponding valve body 15 at the coupling portion 16a. Each engaging piece 16 is inserted in the corresponding insertion slot 14 so that the each valve body 15 is brought into contact with the corresponding group of the ribs 11f by the self weight. Each valve body 15 is hung from the duct main body 11 such that the valve body 15 selectively open and close the openings 12.

Figure 4A:
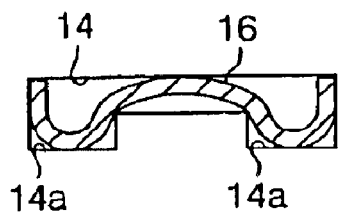
FIG. 4(*a*) is partial cross-sectional view for showing insertion of an engaging piece in an insertion slot.
Figure 4B:
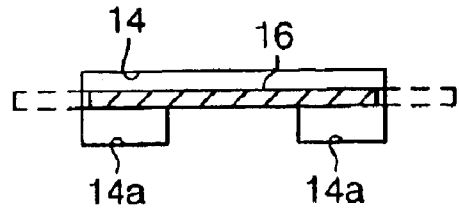

Each insertion slot 14 has an inverted U-shaped cross-section as viewed in FIGS. 3 to 4(b). Each insertion slot 14 has two widened portions 14a. The widened portions 14a permit the corresponding engaging piece 16 to be deformed in the vertical direction when the engaging piece 16 is inserted in the slot 14. As shown in FIG. 2, an inclined surface 14b is formed on part of each valve seat surface 13 that forms a part of one of the insertion slots 14. Each inclined surface 14b is inclined such that the size of the corresponding slot 14 is increased from the bottom toward the inlet. Each inclined surface 14b is located on an imaginary line containing the corresponding valve seat surface 13.

This embodiment provides the following advantages.

When inserting each engaging portion 16 in the corresponding insertion slot 14 for attaching the valve bodies 15 to the duct main body 11 to cover the openings 12, the side portions of the engaging piece 16 are readily and greatly flexed in the widened portions 14a as shown in FIG. 4(a). Therefore, the engaging pieces 16 do not receive a great resistance and are readily inserted in and engaged with the insertion slots 14. Also, during insertion of the engaging pieces 16, each engaging piece 16 is entirely guided into the corresponding slot 14 along the inclined surface 14b at the lower end of the slot 14. This further facilitates the insertion.

Since the resistance of the engaging pieces 16 applied to the insertion slots 14 during insertion is reduced, the side sections of each engaging piece 16 can be formed to be significantly wider than the slot 14. This permits the engaging piece 16 to be firmly held by the edges of the corresponding slot 14. Therefore, when the valve bodies 15 are attached to the duct main body 11 to close the openings 12, the engaging pieces 16 are prevented from coming off the insertion slots 14. Further, since the widened portions 14a of each insertion slot 14 permit the corresponding engaging piece 16 to be greatly deformed, part of each slot 14 other than the widened portions 14a, or a center portion, may be narrowed. Therefore, the engaging piece 16 is firmly held by the narrowed portion. This reliably prevents the engaging piece 16 from coming off the slot 14.

As shown in FIGS. 4(a) and 4(b), the widened portions 14a are formed at the side portions of each insertion slot 14. Thus, the linear section of the upper edge of each insertion slot 14 is formed sufficiently long to further reliably preventing the corresponding engaging piece 16 from coming off the slot 14.

On the parts of the duct main body 11 defining parts of the insertion slots 14, the inclined surfaces 14b are formed. Each inclined surface 14b is inclined such that the size of the corresponding slot 14 is increased from the inlet toward the bottom. This further facilitates insertion of each engaging piece 16 in the corresponding slot 14 along the inclined surface 14b.

The inclined surface 14b of each insertion slot 14 is continuously formed with the corresponding valve seat surface 13. Each valve body 15 is normally brought into contact with the inclined valve seat surfaces 13 by its self weight and closes the corresponding openings 12. At this time, each engaging piece 16 lies along the inclined surface 14b of the corresponding insertion slot 14.

Thus, when the engaging pieces 16 are inserted in the insertion slots 14, each valve body 15 contacts the corresponding valve seat surface 13 and the opening edges of the corresponding insertion slots 14, which reliably seals the insertion slots 14.

Figure 5:
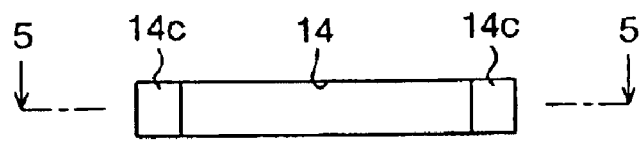
FIG. 5 is a partial front view illustrating an insertion slot of a ventilation device according to a second embodiment.
Figure 6:
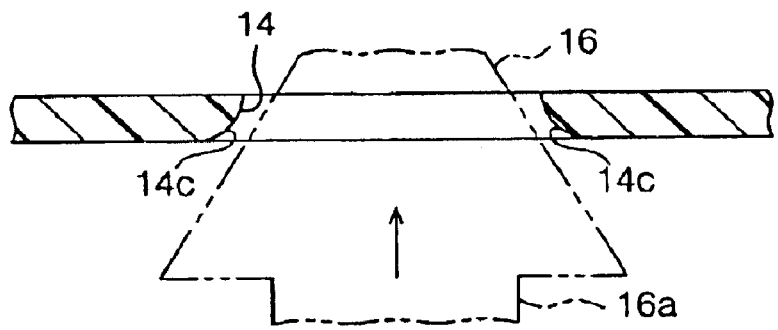
FIG. 6 is a partial cross-sectional view taken along line 6—6 of FIG. 5.

A second embodiment of the present invention will now be described with reference to FIGS. 5 and 6. The differences from the embodiment shown in FIGS. 1 to 4(b) will mainly be discussed.

Each insertion slot 14 has a pair of chamfered portions 14c at the side edges. The chamfered portions 14c make the insertion side of the slot 14, through which the engaging piece 16 is inserted, wider. As shown in FIG. 6, when the engaging piece 16 is inserted in the insertion slot 14, the side sections of the engaging piece 16 are easily guided to the insertion slot 14 by the chamfered portions 14c.

This embodiment provides the following advantages.

When inserting the engaging piece 16 to the insertion slot 14, the engaging piece 16 is easily deformed while being guided by the chamfered portions 14c. The engaging piece 16 does not apply a significant resistance to the walls defining the insertion slot 14 and is easily inserted in the insertion slot 14. As in the embodiment of FIGS. 1 to 4(b), the engaging piece 16 can be formed wide. Therefore, the engaging pieces 16 are reliably held at the insertion slots 14, and the engaging pieces 16 are prevented from coming off the insertion slots 14.

It should be apparent to those skilled in the art that the present invention may be embodied in many other specific forms without departing from the spirit or scope of the invention. Particularly, it should be understood that the invention may be embodied in the following forms.

Figure 7A:
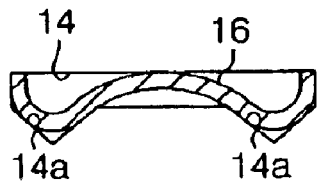
FIG. 7(*a*) is a partial cross-sectional view illustrating a modification.
Figure 7B:
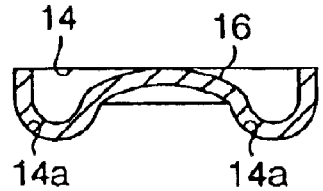

The cross-sectional shape of the widened portions 14a of each insertion slot 14 shown in FIG. 4(a) is not limited to rectangular, but may be substantially triangular as shown in FIG. 7(a). As shown in FIG. 7(b), each widened portion 14a may have a substantially semicircular cross-section.

Figure 7C:
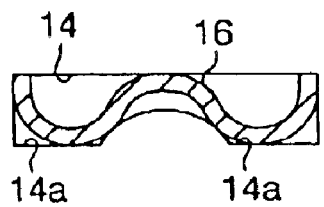

The cross-sectional shape of the center portion between the widened portions 14a of each insertion slot 14 is not limited to rectangular, but may be substantially semicircular as shown in FIG. 7(c).

Figure 7D:
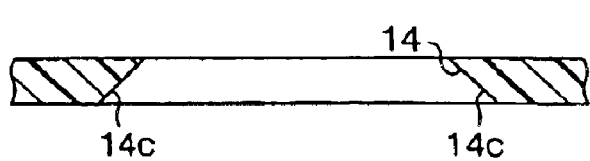
Figure 9:
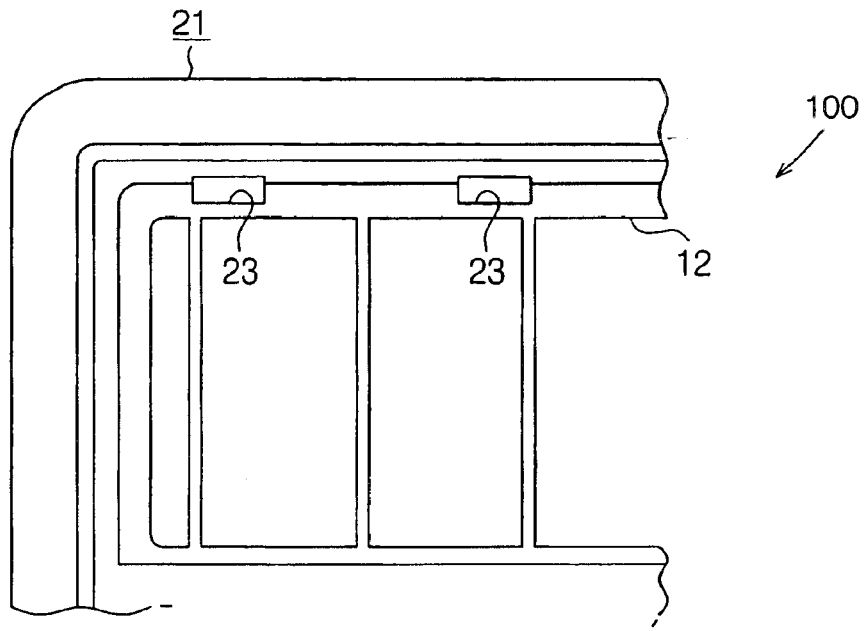
FIG. 9 is a partial front view showing the ventilation device of FIG. 8.
Figure 10A:
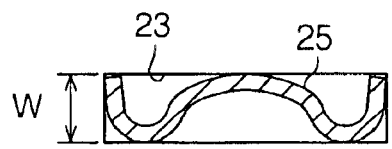
FIG. 10(a) is partial cross-sectional view for showing insertion of an engaging piece in an insertion slot of FIG. 8.
Figure 10B:
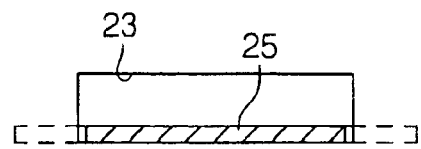
FIG. 10(b) is a partial cross-sectional view for showing insertion of an engaging piece in an insertion slot of FIG. 8.
Figure 11:
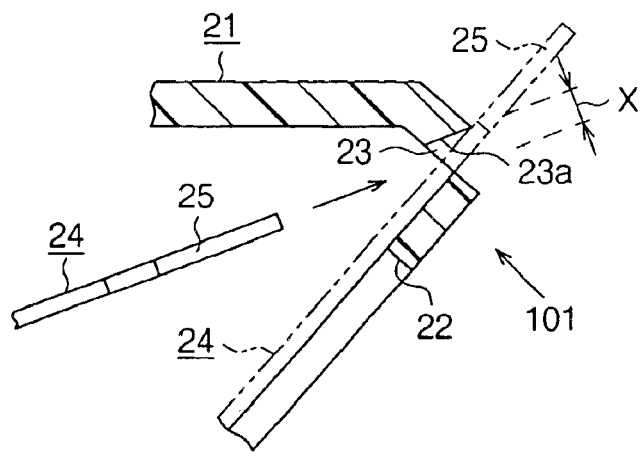
FIG. 11 is a cross-sectional view showing a prior art.

As shown in FIG. 7(d), each insertion slot 14 may have chamfered portions 14c, which are inclined surfaces, at the side edges. The chamfered portions 14c widens the slot 14 toward the inlet through which the engaging piece 16 is inserted in the slot 14.

The chamfered portions 14c may be formed in the insertion slot 14 of FIG. 4(a), which has an inverted U-shaped cross-section.

The present examples and embodiments are to be considered as illustrative and not restrictive and the invention is not to be limited to the details given herein, but may be modified within the scope and equivalence of the appended claims.

What is claimed is:

1. A ventilation device, comprising:

a duct main body having an opening, wherein the duct main body has an upper edge defining a part of the opening, and wherein a plurality of insertion slots are formed in and along the upper edge;

a valve body formed as a sheet, wherein the valve body has a plurality of substantially triangular engaging pieces provided at an upper end of the valve body, wherein each engaging piece is inserted in one of the insertion slots, such that the valve body is hung by the duct body to be capable of opening and closing the opening; and pairs of widened portions, each pair being provided at side sections of one of the insertion slots, respectively, wherein, when the engaging pieces are being inserted in the insertion slots, each pair of the widened portions permit the corresponding engaging piece to be deformed.

2. The ventilation device according to claim 1, wherein the widened portions in each insertion slot are formed at lower parts of the side sections.

3. The ventilation device according to claim 1, wherein the duct main body has a valve seat surface, wherein, when the valve body contacts the valve seat surface, the opening is closed, and wherein the valve seat surface is inclined such that the valve body is brought into contact with the valve seat surface by the self weight.

4. The ventilation device according to claim 1, wherein an inclined surface is formed on each of parts of the duct main body that define lower edges of the insertion slots, and wherein each inclined surface is inclined such that the opening of the corresponding insertion slot is expanded from the bottom to the inlet.

5. The ventilation device according to claim 4, wherein the duct main body has a valve seat surface that surrounds the opening, and wherein the inclined surface of each insertion slot is continuously formed with the valve seat surface.

6. The ventilation device according to claim 1, wherein each insertion slot has length in an arrangement direction, along which the insertion slots are arranged, and a width in a direction perpendicular to the arrangement direction, and wherein the width of each insertion slot at side sections with respect to the length is more than the width at an intermediate section with respect to the length, so that the widened portions are formed at the side sections of each insertion slot with respect to the length of the insertion slot.

7. The ventilation device according to claim 6, wherein each insertion slot has an upper edge that linearly extends along the length of the insertion slot, and a lower edge opposing the upper edge, and wherein the shape of the lower edge is determined such that the space between the upper edge and the lower edge is wider in the side sections with respect to the length of the insertion slot than in the intermediate section.

8. The ventilation device according to claim 7, portions of each insertion slot that corresponds to the widened portions are rectangular.

9. The ventilation device according to claim 7, portions of each insertion slot that corresponds to the widened portions are triangular.

10. The ventilation device according to claim 7, portions of each insertion slot that corresponds to the widened portions are semicircular.

* * * * *